(No Model.)
S. M. BRADLEY.
CAR SWITCH DEVICE.
No. 536,262. Patented Mar. 26, 1895.
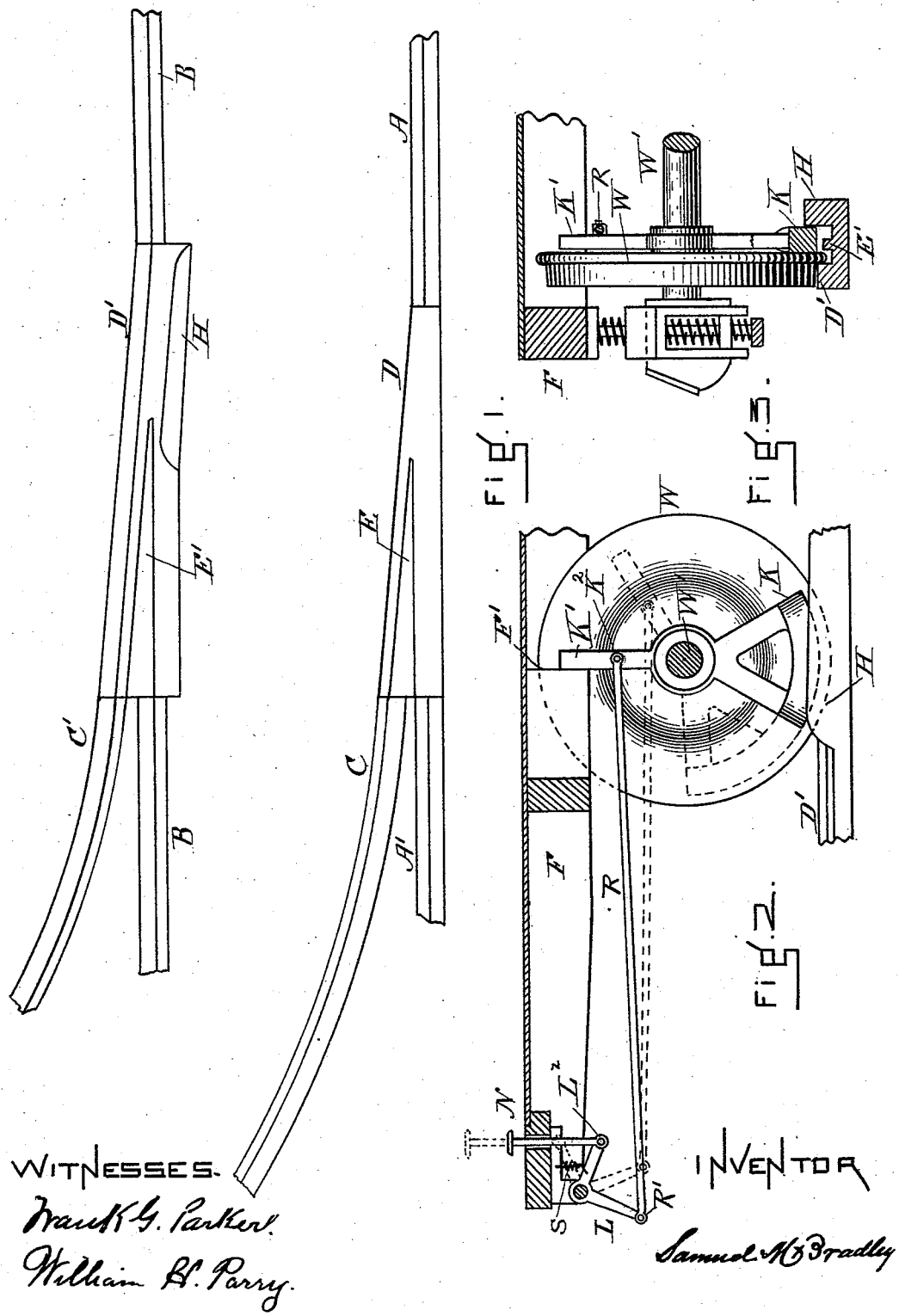

UNITED STATES PATENT OFFICE.

SAMUEL M. BRADLEY, OF KEENE, NEW HAMPSHIRE.

CAR-SWITCH DEVICE.

SPECIFICATION forming part of Letters Patent No. 536,262, dated March 26, 1895.

Application filed September 22, 1894. Serial No. 523,820. (No model.)

*To all whom it may concern:*

Be it known that I, SAMUEL M. BRADLEY, of Keene, in the county of Cheshire and State of New Hampshire, have invented a new and useful Improvement in Car-Switch Devices, of which the following, taken in connection with the accompanying drawings, is a specification.

My invention consists of a device to be attached to the axle of a car and against the inner side of the wheel and adapted to act in connection with the said wheel, and a switch-bed, to wedge the car wheel off from the direct line in which it is running, over to the track upon which it is desired that the car should go, the object being to construct a simple and safe device by which the car driver may control the direction of the car, without leaving it or moving from his position as driver. This object I attain by means of the mechanism illustrated in the accompanying drawings, in which—

Figure 1 is a plan showing a part of the main line of the track and a turn-out connection, the switch-beds being of the "dummy" class,—that is, neither of them have movable tongues. Fig. 2 is a view partly in elevation and partly in longitudinal vertical section, showing parts of a car and the inside of one of the wheels, showing my improvements. Fig. 3 is a view partly in elevation and partly in cross vertical section, showing parts of a car, a car wheel, and a portion of my device; also a part in cross vertical section of one of the switch-beds.

In the drawings, A A' and B B' represent the rails of the main track, and C and C' the rails of a turnout track.

D and D' represent two switch-beds of ordinary construction, except that the part H is always required in my arrangement, while in ordinary work it is sometimes omitted or made so small as not to serve my purpose. The fixed points E and E' are made as usual in dummy switches.

The car body or frame need not be shown or described, as my device is applicable to any of the ordinary cars.

For the purpose of explaining the working of my device, I will represent the car frame by the parts designated by F (Figs. 2 and 3).

W represents a wheel, and W' the axle made and mounted in the usual manner.

The switching wedge K is hung on the axle W as shown, and is provided with an arm K' extending upward as shown in Figs. 2 and 3.

R is a rod connected to the arm K' at $K^2$ and to the bent lever L at R'.

N is an upright connected to the bent lever L at $L^2$, and may be operated by the car driver. A spring S serves to retract the bent lever L.

The operation of my device is as follows:—When the switching wedge K is not in use, it occupies the position indicated by dotted lines (Fig. 2), in which position it is held by the spring S acting through the lever L, rod R and arm K'. When the switching wedge is in the above designated position, then the car will follow the main line, but when it is desired to send it on to the side C C', the switching wedge K is thrown into the position indicated by full lines (Fig. 2). This is effected by depressing the upright N. When the switching wedge K is in its working position, it comes in contact with the fixed part H of the switch-bed, as shown in Figs. 2 and 3, and as the car advances, the wheel W is forced over beyond the fixed switch point E, so that the flanges of the wheels will engage with the fixed points E and E', and thus cause the car to take the side-track.

F' (Fig. 2) is a stop against which the arm K' rests when the switching wedge K is in action.

For convenience, in using cars a switching wedge is placed upon each wheel, so that the car may be directed either to the right or left, as may be desired.

I claim—

In a switching device, the combination of the car wheel and axle, and the switching wedge adapted to swing on the said axle and against the rim of the wheel as described; with a switch-bed continuous with one of the track rails and having a fixed part H adapted to engage with the said switching wedge, substantially as and for the purpose set forth.

In testimony whereof I have signed my name to this specification, in the presence of two subscribing witnesses, on this 20th day of September, A. D. 1894.

SAMUEL M. BRADLEY.

Witnesses:
 FRANK G. PARKER,
 WILLIAM H. BARRY.